Sept. 20, 1927.  A. CHROMCZAK  1,643,003
SECTIONAL FISHING ROD
Original Filed March 27, 1924
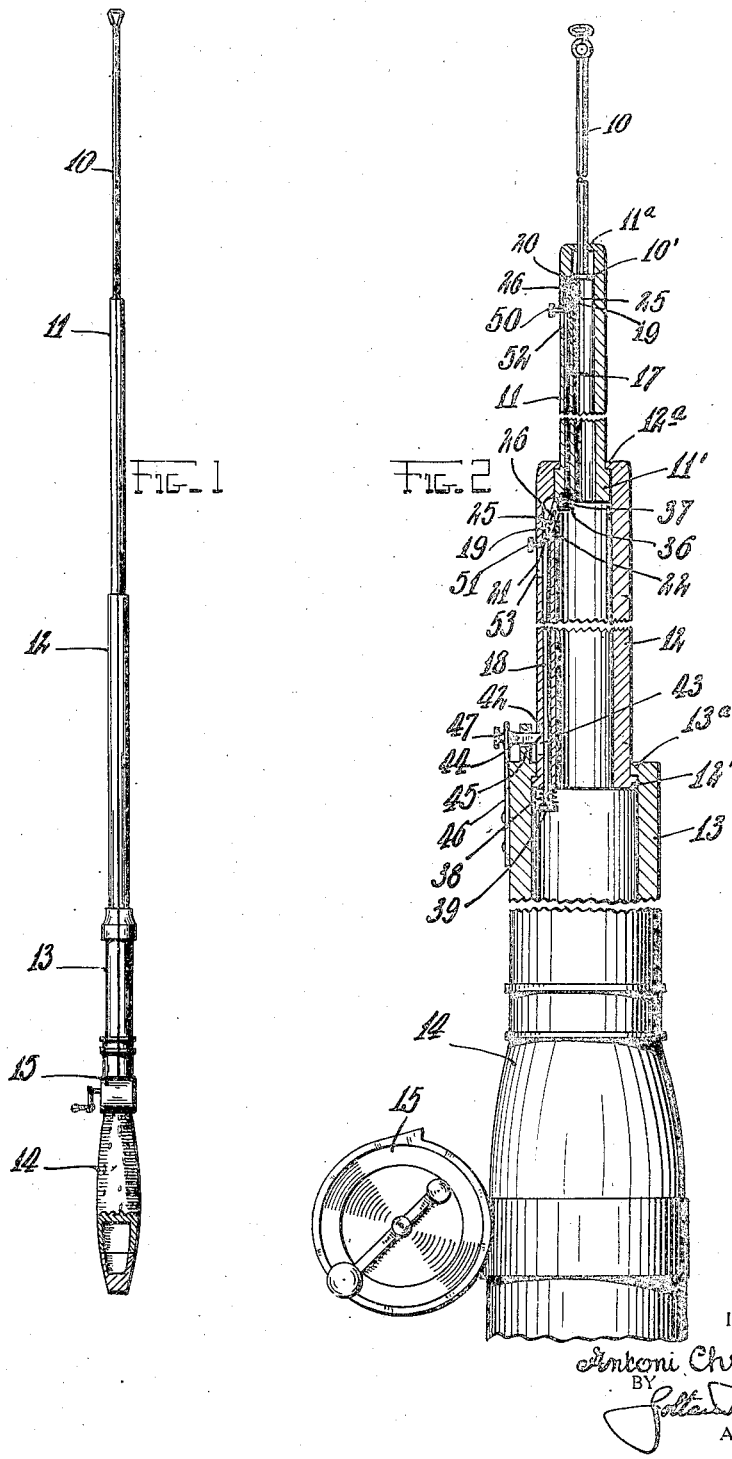
INVENTOR
Antoni Chromczak
BY
ATTORNEY Patented Sept. 20, 1927.

1,643,003

UNITED STATES PATENT OFFICE.

ANTONI CHROMCZAK, OF UTICA, NEW YORK.

SECTIONAL FISHING ROD.

Application filed March 27, 1924, Serial No. 702,294. Renewed August 13, 1927.

This invention relates to fishing rods, having more particular reference to a sectional fishing rod whose different sections are adapted to telescope into each other.

The invention has for an object to provide a fishing rod of this type having novel and improved means for locking the sections with the rod extended.

For further comprehension of the invention, and of the objects and advantages thereof, reference will be had to the following description and accompanying drawing, and to the appended claims in which the various novel features of the invention are more particularly set forth.

Fig. 1 of the drawing is a side elevational view of my improved fishing rod.

Fig 2 is an enlarged longitudinal sectional view, with parts in elevation.

As here embodied my improved fishing rod comprises four sections numbered respectively 10, 11, 12 and 13 which have telescopic connection with one another. The largest one of these sections, numbered, 13, and which receives the other sections when the rod is telescoped, is formed with a handle extension 14 to which an ordinary reel 15 is attached.

The other sections 10, 11 and 12 are each formed with outturned flanges adapted to engage inturned flanges on adjacent sections to prevent withdrawal of the different sections from one another, the outturned flanges on the different sections being numbered 10', 11' and 12' respectively, while the inturned flanges with which they engage are numbered 11ª, 12ª and 13ª respectively.

To hold the various sections in extended position, a pair of rods 17 and 18 are slidably mounted in longitudinal borings in the wall of the two intermediate sections 11 and 12. These rods have pivoted as at 19 to their front ends, by which I mean the ends removed from the handle element 14, the latch arms 20, 21 which are accommodated in slotted apertures 22 extending inwardly to the bores of the said sections from the grooves in which the rods 17, 18 are accommodated.

These latch arms are adapted to have a lateral movement imparted thereto whereby they may be projected partially across the bores of the sections 11 and 12, this movement of the latch arms being effected by moving the rods 17 and 18 longitudinally, swinging movement being imparted to the latch arms by means of pins 15 fixed in the sections 11, 12 and passing through longitudinal slots 26 in the latch arm. These pins, it will be noted are offset from the axis of the latch arms toward the axis of the main rod.

The latch arm is adapted to engage behind the front section 10 of the fishing rod. At their rear ends the rods 17, 18 project beyond the respective sections 11, 12, and the latch arm 21 is adapted to engage behind both the rear end of the section 11 and a head 36 on the rear end of the rod 17, a coiled expansion spring 37 being seated between this head and the rear end of the section 11. A like spring 38 is seated between a head 39 on the rear end of the rod 18 and the rear end of the section 12.

The rod 18 has fixed to the side thereof, near its rear end, a lug 42 which projects radially outward into a short longitudinal slot 43 in the wall of the section 13. This lug 42 is adapted to be engaged, to lock the rod 18 in operative position, by means of a bolt 44 slidably guided in an eye element 45 on the front end of the rear section 13 and fixed on the free end of a flat spring 46 secured at one end to the said rear section this spring having a knob 47 thereon adapted to be grasped when the bolt is to be withdrawn. To move the rods 17, 18 forwardly to swing the latch arms 20, 21 to operative position headed studs 50, 51 are fixed to the respective rods near the front ends thereof and project outwardly through longitudinal slots 52, 53.

As will be apparent, with the parts in the position shown, the various sections are all held locked in extended position, while to release these sections it is only necessary to pull out bolt 44. When this is done, the springs 37, 38 act to urge the rods 17, 18 rearwardly, thus moving the latch arms 20, 21 away from operative position. When the rod is to be set up the sections are all moved to extended position. The rod 17 is then moved forwardly by grasping the stud 50 and then the rod 18, the bolt 44 snapping into place behind the lug 42.

Having thus described my invention what I claim as new and desire to protect by Letters Patent of the United States is as follows:

1. A fishing rod comprising a number of telescopic sections, hinged latch arms adapted to engage behind certain of said sections to lock the same extended, and rods to which said latch arms are hinged and adapted by longitudinal movement to move said latch arms to inoperative position, and a bolt adapted to engage the rear one of said rods to lock the latter with the latch arm hinged thereto in operative position.

2. A fishing rod comprising a number of telescopic sections, hinged latch arms adapted to engage behind certain of said sections to lock the same extended, and rods to which said latch arms are hinged and adapted by longitudinal movement to move said latch arms to inoperative position, and a bolt adapted to engage the rear one of said rods to lock the latter with the latch arm hinged thereto in operative position, engaging both behind the adjacent forward section and the adjacent forward one of said rods.

3. A fishing rod comprising a number of telescopic sections, rods carried by and extending longitudinally of the intermediate sections, latch arms hinged to the forward ends of said rods and being adapted to be swung into and out of position projecting behind the adjacent forward sections by longitudinal movement of said rods, the latch arms on all but the front rod being adapted to engage also behind the rear ends of the adjacent forward rods, and means for locking the rear one of said rods against longitudinal movement.

4. A fishing rod comprising a number of telescopic sections, rods carried by and extending longitudinally of the intermediate sections, latch arms hinged to the forward ends of said rods and being adapted to be swung into and out of position projecting behind the adjacent forward sections by longitudinal movement of said rods, the latch arms on all but the front rod being adapted to engage also behind the rear ends of the adjacent forward rods, and means for locking the rear one of said rods against longitudinal movement, said means comprising a bolt carried by the rear one of said sections and engaging behind a lug on the said rear rod.

5. A fishing rod comprising a number of telescopic sections, hinged latch arms adapted to engage behind certain of said sections to lock the same extended, and rods to which said latch arms are hinged and adapted by longitudinal movement to move said latch arms to inoperative position, said latch arms having longitudinal slots therein through which pass pins carried by the said sections to cause swinging movement to be imparted to said latch arms.

In testimony whereof I have affixed my signature.

ANTONI CHROMCZAK.